United States Patent
Greaves

Patent Number: 5,973,127
Date of Patent: Oct. 26, 1999

[54] MONOAZO DYES SUBSTITUTED BY HALOALKYLCARBAMATE AND SULPHONYLFLUORIDE GROUPS

[75] Inventor: Andrew John Greaves, Manchester, United Kingdom

[73] Assignee: BASF Aktiengesellschaft, Ludwigshafen, Germany

[21] Appl. No.: 09/147,435

[22] PCT Filed: Jun. 24, 1997

[86] PCT No.: PCT/GB97/01705

§ 371 Date: Mar. 5, 1999

§ 102(e) Date: Mar. 5, 1999

[87] PCT Pub. No.: WO97/49770

PCT Pub. Date: Dec. 31, 1997

[30] Foreign Application Priority Data

Jun. 25, 1996 [GB] United Kingdom .................... 9613218

[51] Int. Cl.[6] .......................... C09B 29/085; C09B 29/09; D06P 3/26
[52] U.S. Cl. ........................... 534/732; 534/733; 534/734
[58] Field of Search ................................... 534/732, 733, 534/734

[56] References Cited

U.S. PATENT DOCUMENTS

| 3,398,135 | 8/1968 | Mueller | 534/732 |
| 3,406,164 | 10/1968 | Altermatt et al. | 534/732 X |
| 3,428,622 | 2/1969 | Altermatt et al. | 534/732 X |
| 3,980,636 | 9/1976 | Weaver et al. | 534/732 X |
| 5,739,299 | 4/1998 | Hall | 534/734 |

FOREIGN PATENT DOCUMENTS

| 729180 | 3/1966 | Canada | 534/732 |
| 856348 | 12/1960 | United Kingdom . | |
| 95/20014 | 7/1995 | WIPO . | |

*Primary Examiner*—Fiona T. Powers
*Attorney, Agent, or Firm*—Oblon, Spivak, McClelland, Maier & Neustadt, P.C.

[57] ABSTRACT

Dyes of formula (1)

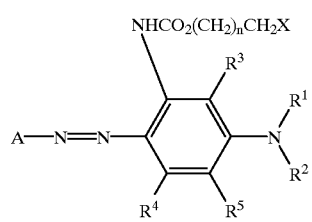

wherein the variables are as defined in the specification and at least one of $R^1$, $R^2$, $R^3$, $R^4$ and $R^5$ or a substituent on A being —$SO_2F$ or a substituent to which at least one —$SO_2F$ group is attached are water-insoluble monoazo dyes useful for coloring synthetic textile materials.

10 Claims, No Drawings

MONOAZO DYES SUBSTITUTED BY HALOALKYLCARBAMATE AND SULPHONYLFLUORIDE GROUPS

This invention relates to azo dyes and more particularly to water-insoluble monoazo dyes containing the fluorosulphonyl group, to a method for their preparation and to their use for colouring synthetic textile materials.

Our International patent application published as WO 95/20014 describes azo compounds which contain at least one fluorosulphonyl group and are free from water-solubilising groups. The use of these compounds for colouring synthetic textile materials is also described.

It has now been found that certain dyes falling within the general class described in WO 95/20014 but not specifically disclosed therein exhibit advantageous properties when applied as disperse dyes to synthetic textile materials.

Thus, according to the invention, there are provided monoazo dyes which are free from water-solubilising groups and have the formula:

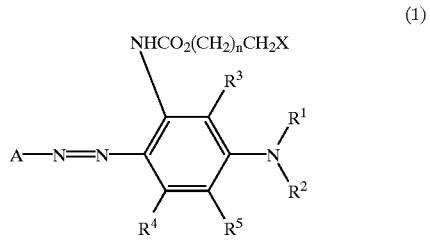

(1)

wherein A represents an optionally substituted aromatic carbocyclic or heterocyclic radical, n represents an integer from 0 to 3, X represents a halogen atom and each of $R^1$, $R^2$, $R^3$, $R^4$ and $R^5$, independently, represents hydrogen or a substituent, at least one of $R^1$, $R^2$, $R^3$, $R^4$ and $R^5$ or a substituent on A being —$SO_2F$ or a substituent to which at least one —$SO_2F$ group is attached.

The dyes of Formula 1 preferably have low solubility in water, typically less than 1%, preferably less than 0.5% and especially less than 0.2% on a weight basis. They are thus free from water-solubilising groups such as sulphonate, carboxylate, phosphonate and quaternary amino groups.

Heterocyclic groups which may be represented by A in the dyes of Formula 1 include thienyl, thiazolyl, isothiazolyl, pyrazolyt, imidazolyl, pyridyl, pyridonyl, 1,2,4- and 1,3,4-thiadiazolyl, furanyl, pyrrolyl, pyridazyl, pyrimidyl, pyrazinyl, benzothiazolyl, benzoisothiazolyl, quinolinyl, isoquinolinyl, indolyl, pyridothiazolyl, pyridoisothiazolyl, 1,2,3-triazolyl and 1,2,4-triazolyl. Carbocyclic groups which may be represented by A include phenyl and naphthyl.

A is preferably thienyl, phenyl, naphthyl, thiazolyl, isothiazolyl, pyridonyl, quinolinyl, more preferably thien-2-yl, phenyl, naphth-1-yl, naphth-2-yl, thiazol-2-yl, isothiazol-5-yl, pyrid-4-on-5-yl or quinolinyl. A is especially preferably thien-2-yl or phenyl.

Examples of suitable substituents for A include cyano, hydroxy, nitro, fluoro, chloro, bromo, iodo, fluorosulphonyl, trifluoromethyl, alkyl, alkoxy, aryl, aryloxy, fluorosulphonylaryl, fluorosulphonylaryloxy, —CO-alkyl, —COO-alkyl, —OCO-alkyl, —CO-aryl, —COO-aryl, —OCO-aryl, —NHCO-alkyl, —NHCO-aryl, —NHSO$_2$-alkyl, —NHSO-$_2$aryl, —S-alkyl, —S-aryl, —SO$_2$-alkyl, —SO$_2$-aryl, —SCN or NR$^6$R$^7$ in which R$^6$ and R$^7$ each independently is —H, alkyl, aryl or cycloalkyl.

In all of the suitable substituents for $A_1$ each alkyl is preferably $C_{1-10}$-alkyl, each alkoxy is preferably $C_{1-10}$-alkoxy and those groups having three or more carbon atoms may be straight or branched chain. Each aryl is preferably phenyl or naphthyl and each alkyl, alkoxy or aryl group may carry an —$SO_2F$ substituent. $R^6$ and $R^7$ together with the —N atom to which they are attached may form a 5- or 6-membered ring such as morpholino or piperidino.

Preferred substituents for A include cyano, nitro, chloro, bromo, fluorosulphonyl, —$C_{1-6}$-alkyl, —$C_{1-6}$-alkoxy, —COC$_{1-6}$-alkyl, —NHCOC$_{1-6}$-alkyl, —OCOC$_{1-6}$-alkyl, —COOC-$_{1-6}$-alkyl, phenoxy, 4-SO$_2$F-phenyl and 4-SO$_2$F-phenoxy.

Substituents which may be represented by $R^1$ and $R^2$ include alkyl and aryl groups which may optionally be substituted by —OH, —CN, —F, —Cl, —Br, —I, —SO$_2$F, alkoxy, alkenyl, phenyl, phenyl-SO$_2$F, aryloxy, aryloxy-SO$_2$F, —N(alkyl)$_2$, —OCO-alkyl, —OCO-alkyl-Cl, —COO-alkyl, —COO-alkyl-OH, —COO-alkyl-CN, —COO-alkyl-CO-alkyl, —COO-alkylphenyl, —OCO-phenyl, —CO-phenyl-SO$_2$F, —OCO-phenyl-NO$_2$, —OCO-phenylalkyl, —OCO-phenylalkoxy, —COO-phenyl, —OCO-(fluorosulphonylphenyl), —O-alkyl-CN, —COO-alkyl-O-alkyl, —COO-alkyl-O-phenyl, —OCO-alkyl-O-phenyl, —COO-alkyl-O-alkyl-O-alkyl, —OCO-alkyl-COO-alkyl, —O-alkyl-COO-alkyl, —O-alkyl-COO-alkyl-O-alkyl, —O-alkyl-COO-alkyl-COO-alkyl, —O-alkyl-OCO-alkyl-O-alkyl, —COO-alkyl-OCO-alkyl or —COO-alkyl-COO-alkyl.

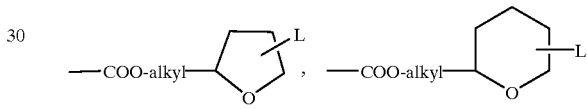

in which L is —H or alkyl.

Substituents which may be represented by $R^3$, $R^4$ and $R^5$ particularly include those listed above as suitable substituents for A. All the alkyl, alkoxy, aryl and aryloxy parts of said substituents may optionally be substituted by the atoms or groups listed above as optional substituents for the alkyl and aryl groups represented by $R^1$ and $R^2$.

The halogen atom represented by X may be fluorine or iodine but is preferably chlorine or bromine.

The integer represented by n is preferably 1 or 2.

The compounds of Formula 1 preferably carry a total of from one to three —SO$_2$F groups, more preferably one or two —SO$_2$F groups and especially one —SO$_2$F group.

A preferred sub-group of compounds of Formula 1 comprises compounds of the formula:

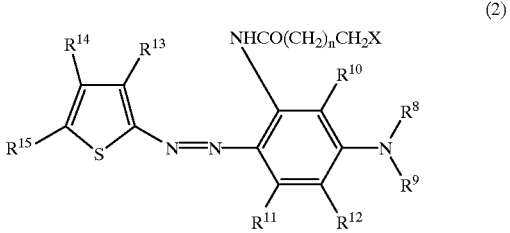

(2)

wherein:

X and n are as defined above;

$R^8$ and $R^9$ each independently is —H, optionally substituted $C_{1-6}$-alkyl or optionally substituted aryl;

$R^{10}$, $R^{11}$ and $R^{12}$ each independently is —H, —F, —Cl, —Br, —I, —SO$_2$F or $C_{1-6}$-alkyl, $C_{1-6}$-alkoxy, $C_{1-4}$alkanoylamino, —NHSO$_2$-alkyl or —O-phenyl each of which may be optionally substituted, and $R^{13}$, $R^{14}$ and $R^{15}$ each independently is —H, $C_{1-6}$-alkyl, —NO$_2$, —COOC$_{1-6}$alkyl, —OCO-alkyl, —Cl, —F, —Br, —I, —COC$_{1-6}$-alkyl, —CN, formyl, protected formyl or —SO$_2$F, provided that at least one of $R^1$ to $R^9$ is —SO$_2$F or carries a substituent to which at least one —SO$_2$F group is attached.

Where $R^{13}$, $R^{14}$ or $R^{15}$ is or contains alkyl the alkyl may be optionally substituted.

Protected formyl groups include for example oxazolidone, imidazoline, thiazolidine, bisulphite, cyanohydrin, hydrazone and oxime.

The optional substituents for groups represented by $R^8$ to $R^{15}$ may be selected from any of the substituents described above for A and for $R^1$ to $R^5$ of Formula 1. The optional substituents for $R^8$ to $R^{15}$ are preferably —CN, —OH, —OCOC$_{1-6}$-alkyl, —COOC$_{1-6}$-alkyl, phenyl, —OCO-phenyl, —OCO-phenyl-SO$_2$F, phenyl-SO$_2$F, —O-phenyl-SO$_2$F, —CO$_2$-phenyl-SO$_2$F, —COOC$_{1-6}$-alkyl-OCOC$_{1-6}$-alkyl and —COOC$_{1-6}$-alkyl-COOC$_{1-6}$-alkyl.

Preferred compounds of Formula 2 are those in which $R^8$ and $R^9$ each independently is —CH$_3$, —C$_2$H$_5$, n-C$_3$H$_7$, —CH(CH$_3$)$_2$, —C$_2$H$_4$CN, —C$_2$H$_4$OH, —CH(CH$_3$)CH$_2$CH$_3$, —C$_4$H$_9$, —CH$_2$(4-fluorosulphonylphenyl), —C$_2$H$_4$(4-fluorosulphonylphenyl), —C$_3$H$_7$(4-fluorosulphonylphenyl), $R^{10}$, $R^{11}$ and $R^{12}$ each independently is —H, —Cl, —CH$_3$, —OCH$_3$, —NHCOCH$_3$, —NHCOC$_2$H$_5$, —NHSO$_2$CH$_3$ or —SO$_2$F and $R^{13}$, $R^{14}$ and $R^{15}$ each independent is —H, —NO$_2$, —CN, CH$_3$, —COCH$_3$, —COOC$_2$H$_5$, —SO$_2$F or —CHO.

Especially preferred compounds of Formula 2 are those in which:

$R^8$ and $R^9$ each independently is —C$_2$H$_4$CN, —C$_2$H$_5$ or (4-fluorosulphonylphenyl)C$_{1-6}$-alkyl;

$R^{10}$ is —H, —OCH$_3$, —CH$_3$ or —SO$_2$F;

$R^{11}$ and $R^{12}$ each independently is —H, —Cl, —CH$_3$, —OCH$_3$ or —SO$_2$F;

$R^{13}$ is —NO$_2$, —COCH$_3$, —COOC$_2$H$_5$ or —SO$_2$F;

$R^{14}$ is —H, —CH$_3$, —SO$_2$F or —Cl, and $R^{15}$ is —NO$_2$, —SO$_2$F or —CHO.

A further preferred sub-group of compounds of Formula (1) are those of the formula:

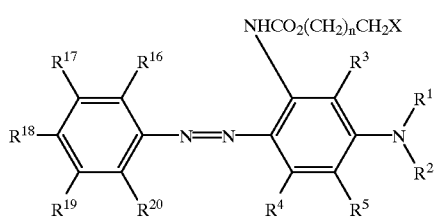

(3)

wherein:

$R^1$ to $R^5$, n and X are as hereinbefore defined, and $R^{16}$ to $R^{20}$ each independently is —H, alkoxy, alkyl, aryl, —NO$_2$, —SO$_2$F, —F, —Cl, —Br, —I, —SO$_2$-alkyl or —CN.

Where a group represented by $R^{16}$ to $R^{20}$ is alkyl, it is preferably $C_{1-10}$-alkyl, more preferably $C_{1-6}$-alkyl. Where a group represented by $R^{16}$ to $R^{20}$ is alkoxy, it is preferably $C_{1-10}$-alkoxy more preferably $C_{1-6}$-alkoxy.

Preferred compounds of Formula 3 are those in which:

$R^1$ and $R^2$ each independently is —CH$_3$, —C$_2$H$_5$, —C$_3$H$_7$, —CH(CH$_3$)$_2$, —C$_4$H$_9$, —C$_5$H$_{11}$, —C$_6$H$_{13}$, —CH(CH$_3$)CH$_2$CH$_3$, —CH$_2$-phenyl, —C$_2$H$_4$-phenyl, —C$_3$H$_6$-phenyl, —C$_2$H$_4$CN, —C$_2$H$_4$OH, —C$_2$H$_4$OCH$_3$, —C$_2$H$_4$COOCH$_3$, —C$_4$H$_8$COCH$_3$, —C$_2$H$_4$COCH$_3$, —C$_2$H$_4$OCOCH$_3$, —C$_3$H$_6$OCOCH$_3$, —C$_4$H$_8$OCOCH$_3$, —C$_2$H$_4$OCO-phenyl, —C$_2$H$_4$OCO-phenyl-SO$_2$F, —C$_2$H$_4$COOC$_2$H$_4$OCH$_3$, —C$_2$H$_4$OC$_2$H$_4$COOC$_2$H$_4$OCH$_3$, allyl, —C$_2$H$_4$O-phenyl, —C$_2$H$_4$O-(fluorosulphonylphenyl), —CH$_2$CH(CN)(OC$_2$H$_4$), $C_{1-6}$-alkylphenyl-SO$_2$F,

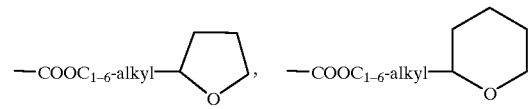

—COOC$_{1-6}$-alkyl-OCOC$_{1-6}$-alkyl or —COOC$_{1-6}$-alkyl-COOC$_{1-6}$-alkyl $R^3$ is —H;

$R^4$ is —H;

$R^5$ is —H, —OCH$_3$, —OC$_2$H$_5$ or —Cl;

$R^{16}$ is —H, —OCH$_3$, —NO$_2$, —Cl, —Br or —CN;

$R^{17}$ is —H;

$R^{18}$ is —SO$_2$F or —NO$_2$;

$R^{19}$ is —H, —OCH$_3$, —SO$_2$F, —Cl, —Br or —NO$_2$; and $R^{20}$ is —H, —OCH$_3$, —Cl, —Br or —CN.

More preferably, compounds of Formula 3 are those in which:

$R^1$ and $R^2$ each independently is —C$_2$H$_5$, —C$_4$H$_9$, —CH(CH$_3$)CH$_2$CH$_3$, —C$_2$H$_4$OCOCH$_3$, —C$_4$H$_8$OCOCH$_3$, —C$_2$H$_4$OCO-phenyl, —CH$_2$-phenyl, $C_{1-6}$-alkylphenyl-SO$_2$F, $C_{1-6}$-alkyl-O-phenylSO$_2$F,

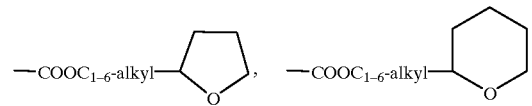

—COOC$_{1-6}$-alkyl-OCOC$_{1-6}$-alkyl or —COOC$_{1-6}$-alkyl-COOC$_{1-6}$-alkyl;

$R^4$ is —H;

$R^5$ is —H, —$C_{1-6}$-alkoxy or —O-phenyl;

each of $R^3$ and $R^{17}$ is —H;

$R^{16}$ and $R^{19}$ each independently is —H, —Cl, —Br or —NO$_2$;

$R^{18}$ is —H or —SO$_2$F; and $R^{20}$ is —H, —Cl, —Br or CN.

An especially preferred sub-group of compounds of Formula 1 are those of the Formula:

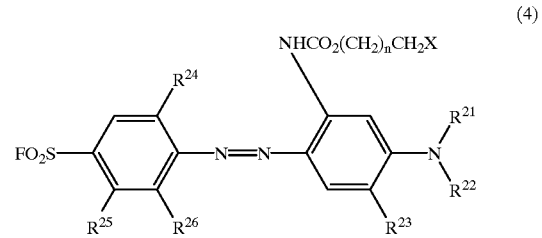

(4)

in which X and n are as defined above;

$R^{21}$ and $R^{22}$ each independently is optionally substituted $C_{1-6}$-alkyl;

$R^{23}$ is —H or $C_{1-6}$-alkoxy;
$R^{24}$ is —CN, —NO$_2$ or —Cl; and
$R^{25}$ and $R^{26}$ each independently is —H, —Cl, —Br or —CN.

In the dyes of Formula 4,
$R^{21}$ and $R^{22}$ each independently is preferably $C_{1-6}$-alkyl or $C_{1-6}$-alkyl substituted by phenyl or —COOC$_{1-6}$-alkyl, and more preferably is ethyl, propyl, isopropyl, butyl, 1-methylpropyl, hexyl, benzyl, ethylphenyl or propylphenyl.

The dyes of Formula 1 may be prepared using conventional methods for the preparation of azo compounds. In particular, they may be prepared by diazotising an aromatic amine of formula A-NH$_2$ and coupling the resulting diazo compound with a coupling component of the formula:

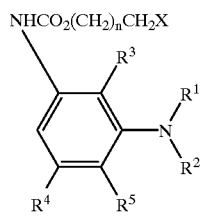

(4)

wherein A, n, X, $R^1$, $R^2$, $R^3$, $R^4$ and $R^5$ are as hereinbefore defined, the diazotisable aromatic amine and the coupling component being free from water-solubilising groups.

The diazotisation and coupling reactions may be performed using conditions conventionally employed for the type of reactant involved. Typically, the amine A-NH$_2$ may be diazotised in an acidic medium, such as acetic, propionic or hydrochloric acid, using a nitrosating agent such as nitrosylsulphuric acid, sodium nitrite or methyl nitrite at a temperature of from −10° C. to 10° C. Coupling with the coupling component of Formula 5 may be achieved by adding the diazotised amine to the coupling component in an alkanol such as methanol at a temperature of from 0° C. to 10° C. After coupling, the compound of Formula 1 may be recovered from the reaction mixture by any convenient means such as by filtration.

The azo compounds of Formula 1 are useful as disperse dyes and are valuable for colouring synthetic textile materials and fibre blends containing such materials.

The synthetic textile material may be selected from secondary cellulose acetate, cellulose triacetate, polyamide, polyacrylonitrile and aromatic polyester. The synthetic textile material is preferably polyamide such as polyhexamethylene adipamide or aromatic polyester, especially polyethylene terephthalate. Fibre blends may comprise mixtures of different synthetic textile materials or mixtures of synthetic and natural textile materials. Preferred fibre blends include those of polyester-cellulose such as polyester-cotton. The textile materials or blends thereof may be in the form of filaments, loose fibres, yam or woven or knitted fabrics.

The azo compound of Formula 1 or mixture thereof, optionally in conjunction with other disperse dyes, may be applied to the synthetic textile materials or fibre blends thereof by processes which are conventionally employed in applying disperse dyes to such materials and fibre blends.

Suitable process conditions include the following:
i) exhaust dyeing at a pH of from 4 to 6.5, at a temperature of from 125° C. to 140° C. for from 10 to 120 minutes and under a pressure of from 1 to 2 bar, a sequestrant optionally being added;
ii) continuous dyeing at a pH of from 4 to 6.5, at a temperature of from 190° C. to 225° C. for from 15 seconds to 5 minutes, a migration inhibitor optionally being added;
iii) printing direct at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for from 10 to 45 minutes for pressure steaming, wetting agents and thickeners (such as alginates) of from 5 to 100% by weight of the dye optionally being added;
iv) discharge printing (by padding the dye on to the textile material, drying and overprinting) at a pH of from 4 to 6.5, migration inhibitors and thickeners optionally being added;
v) carrier dyeing at a pH of from 4 to 6.5, at a temperature of from 95° C. to 100° C. using a carrier such as methylnaphthalene, diphenylamine or 2-phenylphenol, sequestrants optionally being added; and
vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequestrants optionally being added.

In all the above processes, the compound of Formula 1 or mixture thereof may suitably be applied as a dispersion comprising from 0.001% to 4% by weight of the azo compound or mixture thereof in aqueous medium.

The dyes of the invention generally provide coloured textile material exhibiting excellent fastness to washing, light and heat. In particular, the dyes of Formula 1 show superior wash fastness compared with the corresponding dyes described in WO 95/20014 having a group of the formula —NHCO-alkyl or —NHCO$_2$-alkyl in place of the group of formula —NHCO$_2$(CH$_2$)nCH$_2$X.

Compositions comprising dispersions of the compounds of Formula 1 may be formulated. The compositions typically comprise from 1% to 3% by weight of a compound of Formula 1 in an aqueous medium which is preferably buffered at pH 2 to 7, more preferably at pH 4 to 6.

The dye dispersions may further comprise ingredients conventionally used in coloration applications such as dispersing agents, for example lignosulphonates, naphthalene sulphonic acid/formaldehyde condensates or phenol/cresollsulphanilic acid/formaldehyde condensates, surfactants, wetting agents such as alkyl aryl ethoxylates which may be sulphonated or phosphated, inorganic salts, de-foamers such as mineral oils or nonanol, organic liquids and buffers. Dispersing agents may be present at from 10% to 200% on the weight of the azo compound of Formula 1. Wetting agents may be used at from 0% to 20% on the weight of the azo compound of Formula 1. Suitable dispersions may be prepared by bead milling the compound of Formula 1 with glass beads or sand in an aqueous medium.

The invention is illustrated but not limited by the following examples.

In the Examples, all $\lambda_{max}$ values were measured in CH$_2$Cl$_2$.

EXAMPLES 1–13

Dyes having structures identified by the following formula and table were prepared as described below:

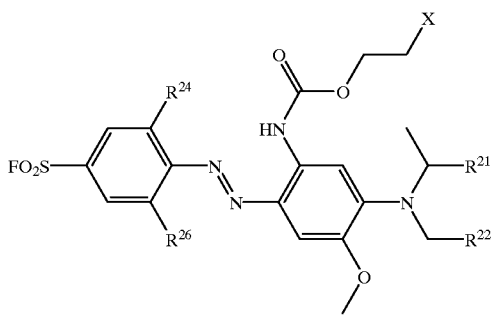

| Example | R²⁴ | R²⁶ | X | R²¹ | R²² |
|---------|-----|-----|-----|-----|-----|
| 1 | H | NO₂ | Cl | H | Me |
| 2 | Cl | NO₂ | Cl | H | Me |
| 3 | Cl | NO₂ | Br | H | Me |
| 4 | Br | NO₂ | Br | H | Me |
| 5 | Br | NO₂ | Cl | H | Me |
| 6 | Cl | NO₂ | Cl | Et | Me |
| 7 | Cl | NO₂ | Cl | Me | Ph |
| 8 | Br | Br | Cl | Me | Ph |
| 9 | CN | CN | Cl | Me | Ph |
| 10 | Br | Br | Br | Et | Me |
| 11 | CN | CN | Br | Et | Me |
| 12 | Br | NO₂ | Cl | Me | Ph |
| 13 | CN | NO₂ | Cl | Me | Ph |

Example 1

β-Chloroethyl chloroformate (0.018 mol) was added slowly to a stirred mixture of 3-N,N-diethylamino-4-methoxyaniline (0.018 mol) and potassium carbonate (0.018 mol) in dichloromethane. The reaction was stirred at room temperature for 2 h and then the mixture was filtered and the filtrate collected and evaporated to dryness to yield the 3-N,N-diethylamino-4-methoxy-N-(β-chloroethyloxycarbonyl)aniline coupler as a brown gum. 2-Nitro-4-fluorosulphonylaniline* (0.01 mol) was dispersed in a mixture of acetic:propionic acid (86:14, 25 ml), cooled to 0–5° C., and nitrosylsulphuric acid (0.01 mol) was added portionwise at 0–5° C. The reaction mixture was stirred for 10 min. at 0–5° C. then added dropwise to a mixture of the 3-N,N-diethylamino-4-methoxy-N-(β-chloroethyloxycarbonyl)aniline coupler (0.01 mol), methanol (50 ml) and ice (50 g). The resultant precipitate was filtered, washed with water and then methanol and oven dried at 50° C. to yield dye (1) as a blue/green solid ($\lambda_{max}$ 587 nm) that gives good fastness to washing, light and heat.

Example 2

As Example 1 but using 2-nitro-4-fluorosulphonyl-6-chloroaniline* in place of 2-nitro-4-fluorosulphonyl-aniline to yield dye (2) as a blue/green solid ($\lambda_{max}$ 592 nm) that gives good fastness to washing, light and heat.

Example 3

As Example 2 but using β-bromoethyl chloroformate in place of β-chloroethyl chloroformate to yield dye (3) as a blue/green solid ($\lambda_{max}$ 596 nm) that gives good fastness to washing, light and heat.

Example 4

As Example 3 but using 2-nitro-4-fluorosulphonyl-6-bromoaniline* in place of 2-nitro-4-fluorosulphonyl-6-chloroaniline to yield dye (4) as a blue/green solid ($\lambda_{max}$ 600 nm) that gives good fastness to washing, light and heat.

Example 5

As Example 2 but using 2-nitro-4-fluorosulphonyl-6-bromoaniline in place of 2-nitro-4-fluorosulphonyl-6-chloroaniline to yield dye (5) as a blue/green solid ($\lambda_{max}$ 600 nm) that gives good fastness to washing, light and heat.

Example 6

As Example 2 but using 3-(N-secbutyl-N-ethylamino)-4-methoxyaniline in place 3-N,N-diethylamino-4-methoxyaniline to yield dye (6) as a blue/green solid ($\lambda_{max}$ 596 nm) that gives good fastness to washing, light and heat.

Example 7

As Example 2 but using 3-(N-sopropyl-N-benzylamino)-4-methoxyaniline in place of 3-N,N-diethylamino-4-methoxyaniline to yield dye (7) as a blue/green solid ($\lambda_{max}$ 578 nm) that gives good fastness to washing, light and heat.

Examples 8 and 9

β-Chloroethyl chloroformate (0.018 mol) was added slowly to a stirred mixture of 3-(N-isopropyl-N-benzylamino)-4-methoxyaniline (0.018 mol) and potassium carbonate (0.018 mol) in dichloromethane. The reaction was stirred at room temperature for 2 h and then the mixture was filtered and the filtrate collected and evaporated to dryness to yield the 3-(N-isopropyl-N-benzylamino)-4-methoxy-N-(β-chloroethyloxycarbonyle)anitine coupler as a brown gum. 2,6-Dibromo-4-fluorosulphonylaniline* (0.01 mol) was dispersed in a mixture of acetic:propionic acid (86:14, 25 ml), cooled to 0–5° C., and nitrosylsulphuric acid (0.01 mol) was added portionwise at 0–5° C. The reaction mixture was stirred for 10 min. at 0–5° C. and then added dropwise to a mixture of the 3-(N-isopropyl-N-benzylamino)-4-methoxy-N-(β-chloroethyloxycarbonyl)aniline coupler in methanol (50 ml) and ice (50 g). The resultant precipitate was filtered, washed with water and then methanol and oven dried at 50° C. to yield dye (8) as a red solid ($\lambda_{max}$ 502 nm). Copper (I) cyanide (0.02 mol) was added to a solution of dye (8) in dimethylformamide (10 ml) and the mixture was stirred for 30 min. The mixture was drowned out into ice and the precipitate collected by filtration, washed with water and oven dried to yield dye (9) as a bluelgreen solid ($\lambda_{max}$ 632 nm) that gives good fastness to washing, light and heat.

Examples 10 and 11

As Examples 8 and 9 but using 3-(N-secbutyl-N-ethylamino)-4-methoxyaniline in place of 3-(N-isopropyl-N-benzylamino)-4-methoxyaniline, and β-bromoethyl chloroformate in place of β-chloroethyl chloroformate to yield dye (10) as a red solid ($\lambda_{max}$ 516 nm), and subsequently dye (11) as a blue/green solid ($\lambda_{max}$ 624 nm) that gives good fastness to washing, light and heat.

Examples 12 and 13

As Examples 8 and 9 but using 2-nitro-4-fluorosulphonyl-6-bromoaniline in place of 2,6-dibromo-4-fluorosulphonylaniline to yield dye (12) as a violet solid, and subsequently dye (13) as a bluelgreen solid ($\lambda_{max}$ 624 nm) that gives good fastness to washing, light and heat.

Examples 14 and 15

As Examples 8 and 9 but using (3-N,N-diethylaminoaniline in place of 3-(N-isopropyl-N- benzylamino)-4-methoxyaniline to yield dye (14) as an orange-brown solid ($\lambda_{max}$ 478 nm), and subsequently dye (15) as a blue/green solid ($\lambda_{max}$ 600 nm) that gives good fastness to washing, light and heat.

*The preparation of the 4-fluorosulphonylanilines are reported in WO 95/20014.

Example 16

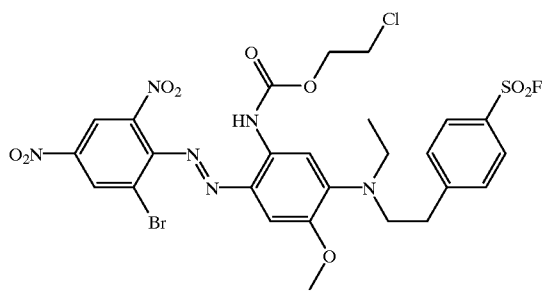

As Example 1 except using 3-(N-ethyl-N4'-fluorosulphonylphenylethyl)amino-4-methoxyaniline** in place of 3-N,N-diethyl-4-methoxyaniline, and 2,4-dinitro-6-bromoaniline in place of 2-nitro-4-fluorosulphonylaniline to yield dye (16) ($\lambda_{max}$ 600 nm and 604 nm).

**The preparation of 3-(N-ethyl-N4'-fluorosulphonylphenylethyl)amino-4-methoxyacetanilide is reported in WO 95/20014. Acetyl hydrolysis is achieved using 2:1:1 methylated spirits 74 o.p./conc. hydrochloric acid water to yield 3-(N-ethyl-N-4'-fluorosulphonylphenylethyl)amino-4-methoxyaniline

I claim:

1. A monoazo dye which is free from water-solubilising groups and has the formula:

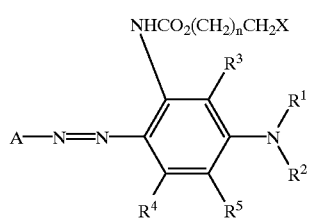

wherein A represents an optionally substituted aromatic carbocyclic or heterocyclic radical, n represents an integer from 0 to 3, X represents a halogen atom and each of $R^1$, $R^2$, $R^3$, $R^4$ and $R^5$, independently, represents hydrogen or a substituent, at least one of $R^1$, $R^2$, $R^3$, $R^4$ and $R^5$ or a substituent on A being —$SO_2F$ or a substituent to which at least one —$SO_2F$ group is attached.

2. A monoazo dye according to claim 1 having the formula:

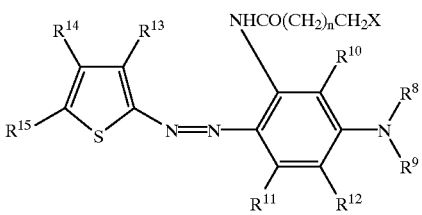

wherein:
X and n are as defined in claim 1;
$R^8$ and $R^9$ each independently is —H, optionally substituted $C_{1-6}$-alkyl or optionally substituted aryl;
$R^{10}$, $R^{11}$ and $R^{12}$ each independently is —H, —F, —Cl, —Br, —I, —$SO_2F$ or $C_{1-6}$-alkyl, $C_{1-6}$-alkoxy, $C_{1-4}$alkanoylamino, —$NHSO_2$-alkyl or —O-phenyl each of which may be optionally substituted, and
$R^{13}$, $R^{14}$ and $R^{15}$ each independently is —H, $C_{1-6}$-alkyl, —$NO_2$, —$COOC_{1-6}$-alkyl, —OCO-alkyl, —Cl, —F, —Br, —I, —$COC_{1-6}$-alkyl, —CN, formyl, protected formyl or —$SO_2F$ provided that at least one of $R^8$ to $R^{15}$ is —$SO_2F$ or carries a substituent to which at least one —$SO_2F$ group is attached.

3. A monoazo dye according to claim 2, wherein:
$R^8$ and $R^9$ each independently is —$CH_3$, —$C_2H_5$, n-$C_3H_7$, —$CH(CH_3)_2$, —$C_2H_4CN$, —$C_2H_4OH$, —CH($CH_3$)$CH_2CH_3$, —$C_4H_9$, —$CH_2$(4-fluorosulphonylphenyl), —$C_2H_4$(4-fluorosulphonylphenyl), —$C_3H_7$(4-fluorosulphonylphenyl),
$R^{10}$, $R^{11}$ and $R^{12}$ each independently is —H, —Cl, —$CH_3$, —$OCH_3$, —$NHCOCH_3$, —$NHCOC_2H_5$, —$NHSO_2CH_3$ or —$SO_2F$, and
$R^{13}$, $R^{14}$ and $R^{15}$ each independently is —H, —$NO_2$, —CN, $CH_3$, —$COCH_3$, —$COOC_2H_5$, —$SO_2F$ or —CHO.

4. A monoazo dye according to claim 3, wherein:
$R^8$ and $R^9$ each independently is —$C_2H_4CN$, —$C_2H_5$ or (4-fluorosulphonylphenyl)$C_{1-6}$-alkyl;
$R^{10}$ is —H, —$OCH_3$, —$CH_3$ or —$SO_2F$;
$R^{11}$ and $R^{12}$ each independently is —H, —Cl, —$CH_3$, —$OCH_3$ or —$SO_2F$;
$R^{13}$ is —$NO_2$, —$COCH_3$, —$COOC_2H_5$ or —$SO_2F$;
$R^{14}$ is —H, —$CH_3$, —$SO_2F$ or —Cl, and
$R^{15}$ is —$NO_2$, —$SO_2F$ or —CHO.

5. A monoazo dye according to claim 1 having the formula:

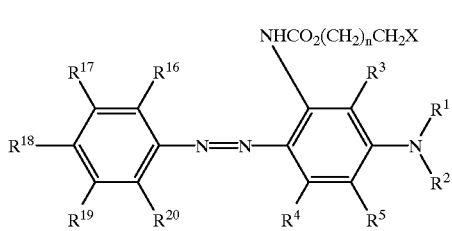

wherein:
$R^1$ to $R^5$, n and X are defined in claim 1, and
$R^{16}$ to $R^{20}$ each independently is —H, alkoxy, alkyl, aryl, —$NO_2$, —$SO_2F$, —F, —Cl, —Br, —I, —$SO_2$-alkyl or —CN.

6. A monoazo dye according to claim 5, wherein:

$R^1$ and $R^2$ each independently is —$CH_3$, —$C_2H_5$, —$C_3H_7$, —$CH(CH_3)_2$, —$C_4H_9$, —$C_5H_{11}$, —$C_6H_{13}$, —$CH(CH_3)CH_2CH_3$, —$CH_2$-phenyl, —$C_2H_4$-phenyl, —$C_3H_6$-phenyl, —$C_2H_4CN$, —$C_2H_4OH$, —$C_2H_4OCH_3$, —$C_2H_4COOCH_3$, —$C_4H_8COCH_3$, —$C_2H_4COCH_3$, —$C_2H_4OCOCH_3$, —$C_3H_6OCOCH_3$, —$C_4H_8OCOCH_3$, —$C_2H_4OCO$-phenyl, —$C_2H_4OCO$-phenyl-$SO_2F$, —$C_2H_4COOC_2H_4OCH_3$, —$C_2H_4OC_2H_4COOC_2H_4OCH_3$, allyl, —$C_2H_4O$-phenyl, —$C_2H_4O$-(fluorosulphonylphenyl), —$CH_2CH(CN)(OC_2H_4)$, $C_{1-6}$-alkylphenyl-$SO_2F$,

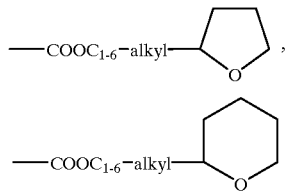

—$COOC_{1-6}$-alkyl-$OCOC_{1-6}$-alkyl or —$COOC_{1-6}$-alkyl-$COOC_{1-6}$-alkyl $R^3$ is —H;
$R^4$ is —H;
$R^5$ is —H, —$OCH_3$, —$OC_2H_5$ or —Cl;
$R^{16}$ is —H, —$OCH_3$, —$NO_2$, —Cl, —Br or —CN;
$R^{17}$ is —H;
$R^{18}$ is —$SO_2F$ or —$NO_2$;
$R^{19}$ is —H, —$OCH_3$, —$SO_2F$, —Cl, —Br or —$NO_2$; and
$R^{20}$ is —H, —$OCH_3$, —Cl, —Br or —CN.

7. A monoazo dye according to claim 6, wherein:

$R^1$ and $R^2$ each independently is —$C_2H_5$, —$C_4H_9$, —CH($CH_3$)$CH_2CH_3$, —$C_2H_4OCOCH_3$, —$C_4H_8OCOCH_3$, —$C_2H_4OCO$-phenyl, —$CH_2$-phenyl, $C_{1-6}$-alkylphenyl-$SO_2F$, $C_{1-6}$-alkyl-O-phenyl$SO_2F$,

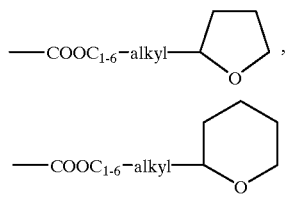

—$COOC_{1-6}$alkyl-$OCOC_{1-6}$-alkyl or —$COOC_{1-6}$-alkyl-$COOC_{1-6}$-alkyl;
$R^4$ is —H;

$R^5$ is —H, —$C_{1-6}$-alkoxy or —O-phenyl;
each of $R^3$ and $R^{17}$ is —H;
$R^{16}$ and $R^{19}$ each independently is —H, —Cl, —Br or —$NO_2$;
$R^{18}$ is —H or —$SO_2F$; and
$R^{20}$ is —H, —Cl, —Br or CN.

8. A monoazo dye according to claim 7 having the formula:

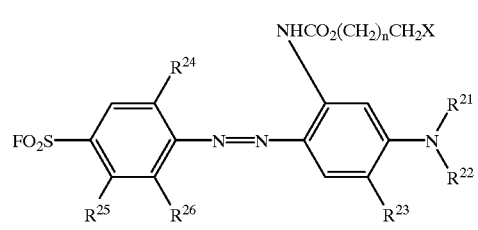

(4)

in which X and n are as defined in claim 1;
$R^{21}$ and $R^{22}$ each independently is optionally substituted $C_{1-6}$-alkyl;
$R^{23}$ is —H or $C_{1-6}$-alkoxy;
$R^{24}$ is —CN, —$NO_2$ or —Cl; and
$R^{25}$ and $R^{26}$ each independently is —H, —Cl, —Br or —CN.

9. A method for the preparation of a monoazo dye according to claim 1 which comprises diazotising an aromatic amine of formula A-$NH_2$ and coupling the resulting diazo compound with a coupling component of the formula:

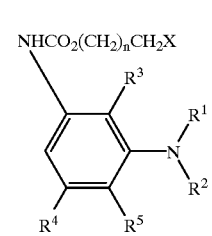

(5)

wherein A, n, X, $R^1$, $R^2$, $R^3$, $R^4$ and $R^5$ are as defined in claim 1, the diazotisable aromatic amine and the coupling component being free from water-solubilising groups.

10. A process for colouring a synthetic textile material or a fibre blend thereof which comprises applying thereto a monoazo dye according to any one of claims 1 to 8.

* * * * *

UNITED STATES PATENT AND TRADEMARK OFFICE
CERTIFICATE OF CORRECTION

PATENT NO.   : 5,973,127
DATED        : October 26, 1999
INVENTOR(S)  : Andrew John Greaves It is certified that error appears in the above-identified patent and that said Letters Patent is hereby corrected as shown below:

Column 1,
Line 62, "—NHCO-aryl," should read -- —NHCO$_2$-aryl, --.

Column 2,
Line 26, "or —COO-" should read -- —COO- --;
Line 30, formula,     "                                                                        "

should read

--

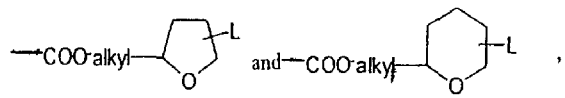

--;

Line 50, formula ( 2),     "                                                   (2)"

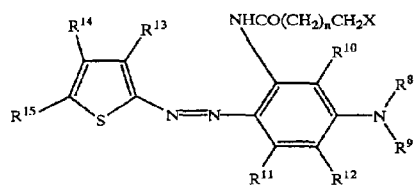

should read     . --

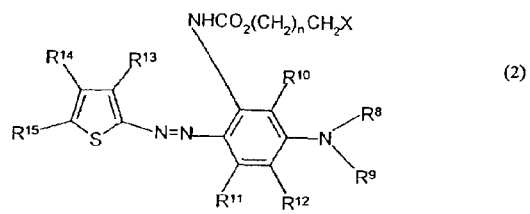

(2)

--;

UNITED STATES PATENT AND TRADEMARK OFFICE
CERTIFICATE OF CORRECTION

PATENT NO.    : 5,973,127
DATED         : October 26, 1999
INVENTOR(S)   : Andrew John Greaves It is certified that error appears in the above-identified patent and that said Letters Patent is hereby corrected as shown below:

Column 4,
Lines 9 and 10, "$C_{1-6}$-alkylphenyl-$SO_2$F." should read -- $C_{1-6}$-alkylphenyl-$SO_2$F or an alkyl or aryl group substituted by --;
Lines 33 and 34, "$C_{1-6}$-alkyl-O-phenyl$SO_2$F." should read -- $C_{1-6}$-alkyl-O-phenyl-$SO_2$F, or an alkyl or aryl group substituted by --.

Column 10,
Line 2, formula (2), should read --

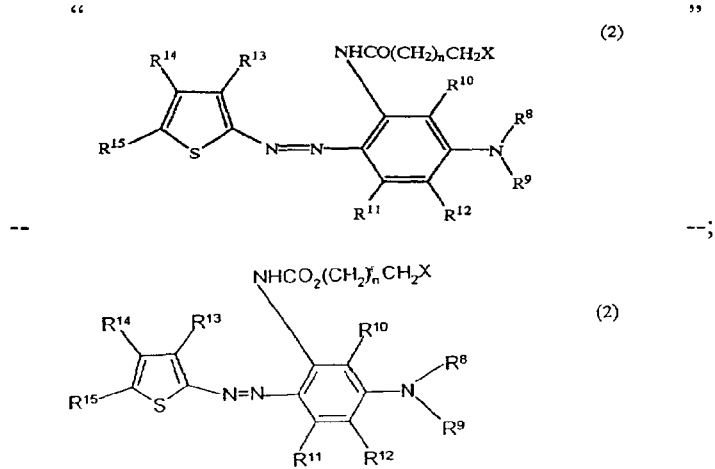

--;

Line 40, "according to claim 3," should read -- according to claim 2, --.

Column 11,
Lines 11 and 12, "$C_{1-6}$-alkylphenyl-$SO_2$F." should read -- $C_{1-6}$-alkylphenyl-$SO_2$F or an alkyl or aryl group substituted by --;
Line 35, "according to claim 6," should read -- according to claim 5 --;
Lines 39 and 40, "$C_{1-6}$-alkyl-O-phenyl$SO_2$F." should read -- $C_{1-6}$-alkyl-O-phenyl-$SO_2$F, or an alkyl or aryl group substituted by --.

UNITED STATES PATENT AND TRADEMARK OFFICE
CERTIFICATE OF CORRECTION

PATENT NO. : 5,973,127
DATED : October 26, 1999
INVENTOR(S) : Andrew John Greaves It is certified that error appears in the above-identified patent and that said Letters Patent is hereby corrected as shown below:

Column 12,
Line 8, "according to claim 7" should read -- according to claim 5 --.

Signed and Sealed this

Sixth Day of August, 2002

Attest:

JAMES E. ROGAN
Attesting Officer
Director of the United States Patent and Trademark Office

UNITED STATES PATENT AND TRADEMARK OFFICE
CERTIFICATE OF CORRECTION

PATENT NO.   : 5,973,127
DATED        : October 26, 1999
INVENTOR(S)  : Andrew John Greaves It is certified that error appears in the above-identified patent and that said Letters Patent is hereby corrected as shown below:

Column 1,
Line 63, "—NHSO-$_2$aryl," should read -- —NHSO$_2$-aryl, --.

Column 2,
Line 26, "or —COO-" should read -- ,—COO- --;

Signed and Sealed this

Twenty-fifth Day of March, 2003

JAMES E. ROGAN
*Director of the United States Patent and Trademark Office*